(12) United States Patent
Bank et al.

(10) Patent No.: US 9,894,121 B2
(45) Date of Patent: *Feb. 13, 2018

(54) GUIDING A DESIRED OUTCOME FOR AN ELECTRONICALLY HOSTED CONFERENCE

(71) Applicant: International Business Machines Corporation, Armonk, NY (US)

(72) Inventors: Judith H. Bank, Morrisville, NC (US); Lisa M. W. Bradley, Cary, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,508

(22) Filed: Sep. 7, 2016

(65) Prior Publication Data

US 2016/0381097 A1    Dec. 29, 2016

Related U.S. Application Data

(63) Continuation of application No. 14/066,944, filed on Oct. 30, 2013, now Pat. No. 9,462,224, which is a
(Continued)

(51) Int. Cl.
*G06F 15/16* (2006.01)
*H04L 29/06* (2006.01)
(Continued)

(52) U.S. Cl.
CPC .......... *H04L 65/403* (2013.01); *G06Q 10/06* (2013.01); *G06Q 10/10* (2013.01);
(Continued)

(58) Field of Classification Search
CPC ....... H04L 65/403; H04L 67/22; H04L 51/32; H04L 12/18; H04L 12/1827; H04L 7/15; G06Q 10/10; G06Q 10/06
(Continued)

(56) References Cited

U.S. PATENT DOCUMENTS 5,371,673 A    12/1994  Fan
7,769,705 B1   8/2010   Luechtefeld
(Continued)

FOREIGN PATENT DOCUMENTS

WO    9953390 A2    10/1999

OTHER PUBLICATIONS

Balduzzi, P. et al., "Voting in Corporate Boards with Heterogeneous Preferences," [online] CESifo Working Paper Series No. 3332, Jan. 31, 2011 [retrieved Feb. 18, 2013] retrieved from the Internet: <http://www.cesifo-group.de/portal/page/portal/DocBase_Content/WP/WP-CESifo_Working_Papers/wp-cesifo-2011/wp-cesifo-2011-01/cesifo1_wp3332.pdf>, 36 pgs.
(Continued)

*Primary Examiner* — Frantz Jean
(74) *Attorney, Agent, or Firm* — Cuenot, Forsythe & Kim, LLC

(57) ABSTRACT

Arrangements described herein relate to guiding a desired outcome for an electronically hosted conference. During the electronically hosted conference, participant activity related to the electronically hosted conference can be monitored for each of a plurality of participants participating in the electronically hosted conference. Based on the participant activity, a sentiment of each of the plurality of participants with regard to a subject of the electronically hosted conference can be determined. A list of the participants can be presented to a user. The list of the participants can indicate an order in which to poll the participants to achieve the desired outcome
(Continued)

for a decision requested of the participants in the electronically hosted conference.

20 Claims, 3 Drawing Sheets

Related U.S. Application Data continuation of application No. 13/785,558, filed on Mar. 5, 2013, now Pat. No. 9,113,035.

(51) Int. Cl.
<table>
<tr><td>H04N 7/15</td><td>(2006.01)</td></tr>
<tr><td>G06Q 10/06</td><td>(2012.01)</td></tr>
<tr><td>G06Q 10/10</td><td>(2012.01)</td></tr>
<tr><td>H04L 12/18</td><td>(2006.01)</td></tr>
<tr><td>H04L 12/58</td><td>(2006.01)</td></tr>
<tr><td>H04L 29/08</td><td>(2006.01)</td></tr>
</table>

(52) U.S. Cl.
CPC ........... *H04L 12/1827* (2013.01); *H04N 7/15* (2013.01); *H04L 51/32* (2013.01); *H04L 67/22* (2013.01)

(58) Field of Classification Search
USPC ................................................ 709/204, 206
See application file for complete search history.

(56) References Cited

U.S. PATENT DOCUMENTS

<table>
<tr><td>8,098,273 B2</td><td>1/2012</td><td>Khouri et al.</td></tr>
<tr><td>9,113,035 B2</td><td>8/2015</td><td>Bank et al.</td></tr>
<tr><td>2005/0154556 A1</td><td>7/2005</td><td>Keller et al.</td></tr>
<tr><td>2008/0320082 A1</td><td>12/2008</td><td>Kuhlke et al.</td></tr>
<tr><td>2010/0223581 A1*</td><td>9/2010</td><td>Manolescu ............ G06Q 10/00 715/853</td></tr>
<tr><td>2011/0225013 A1*</td><td>9/2011</td><td>Chavez .................. G06Q 10/10 705/7.18</td></tr>
<tr><td>2011/0276369 A1</td><td>11/2011</td><td>Bean et al.</td></tr>
<tr><td>2012/0262296 A1</td><td>10/2012</td><td>Bezar</td></tr>
<tr><td>2012/0288068 A1</td><td>11/2012</td><td>Jaiswal et al.</td></tr>
<tr><td>2013/0018968 A1</td><td>1/2013</td><td>Pennacchiotti et al.</td></tr>
<tr><td>2014/0122588 A1</td><td>5/2014</td><td>Nimri</td></tr>
<tr><td>2014/0253672 A1</td><td>9/2014</td><td>Bank et al.</td></tr>
<tr><td>2014/0258393 A1</td><td>9/2014</td><td>Bank et al.</td></tr>
</table>

OTHER PUBLICATIONS

Hirashima, D. et al., "Development and Evaluation of a Minutes System Focusing on Importance in a Meeting," [online] In Proc. of 18th Int'l Conf. on Advanced Information Networking and Applications, AINA '04, vol. 2, IEEE, 2004, 2 pgs.

Kanayama, H. et al., "Deeper Sentiment Analysis Using Machine Translation Technology," [online] In Proc. of 20th Int'l. Conf. on Computational Linguistics, COLING '04, Art. No. 494, 2004 [retrieved Feb. 18, 2013], retrieved from the Internet: <acl.ldc.upenn.edu/C/C04/C04-1071.pdf>, 7 pgs.

U.S. Appl. No. 13/785,558, Non-Final Office Action, dated Jan. 5, 2015, 6 pg.

U.S. Appl. No. 13/785,558, Notice of Allowance, dated Apr. 13, 2015, 7 pg.

U.S. Appl. No. 14/066,944, Non-Final Office Action, dated Feb. 2, 2016, 6 pg.

U.S. Appl. No. 14/066,944, Notice of Allowance, dated Jun. 16, 2016, 7 pg.

\* cited by examiner

200

During an electronically hosted conference, monitor participant activity, for each of a plurality of participants participating in the electronically hosted conference, related to the electronically hosted conference
202

Based on the participant activity, determine, via a processor, a sentiment of each of the plurality of participants with regard to a subject of the electronically hosted conference
204

Present to a user a list of the participants, the list of the participants sequentially ordered, based on the sentiment of each of the plurality of participants, indicating an order in which to poll the participants to achieve the desired outcome for a decision requested of the participants in the electronically hosted conference
206

FIG. 2

GUIDING A DESIRED OUTCOME FOR AN ELECTRONICALLY HOSTED CONFERENCE

BACKGROUND

Arrangements described herein relate to conferences and, more particularly, electronically hosted conferences.

The use of electronically hosted conferences, such as web conferences and teleconferences, has grown significantly over the last decade, facilitated by the proliferation of communication networks, such as the Internet and mobile communication networks, and increases in available bandwidth. These services are valuable tools in the present communication age.

Web conferencing is a service that allows conferencing events to be shared with remote locations. In general, the service is made possible by Internet technologies, particularly on TCP/IP connections. Web conferencing allows real-time point-to-point communications as well as multicast communications from one sender to many receivers during a Web conference. Further, Web conferencing offers information, such as text-based messages, voice and video chat to be simultaneously shared across geographically dispersed locations. Applications for web conferencing include, but are not limited to, meetings, training events, lectures, or short presentations.

Teleconferencing is another service that allows conferencing events to be shared with remote locations. A teleconference is a live exchange of communications using telephony services. Such services may be provided over a variety of communication networks, including public switched telephone networks, mobile communication networks, Internet technologies, and the like. In contrast to a Web conference, which may communicate both audio and video signals, a teleconference typically is focused on communication of audio signals, for example speech and other audio signals.

BRIEF SUMMARY

One or more embodiments disclosed within this specification relate to conferences electronically hosted conferences and, more particularly, guiding a desired outcome for an electronically hosted conference.

An embodiment can include a method of guiding a desired outcome for an electronically hosted conference. The method can include, during the electronically hosted conference, monitoring participant activity, for each of a plurality of participants participating in the electronically hosted conference, related to the electronically hosted conference. Based on the participant activity, via a processor, a sentiment of each of the plurality of participants with regard to a subject of the electronically hosted conference can be determined. A list of the participants can be presented to a user. The list of the participants can indicate an order in which to poll the participants to achieve the desired outcome for a decision requested of the participants in the electronically hosted conference.

Another embodiment can include a system having a processor. The processor can be configured to initiate executable operations including during the electronically hosted conference, monitoring participant activity, for each of a plurality of participants participating in the electronically hosted conference, related to the electronically hosted conference. Based on the participant activity, a sentiment of each of the plurality of participants with regard to a subject of the electronically hosted conference can be determined. A list of the participants can be presented to a user. The list of the participants can indicate an order in which to poll the participants to achieve the desired outcome for a decision requested of the participants in the electronically hosted conference.

Another embodiment can include a computer program product for guiding a desired outcome for an electronically hosted conference. The computer program product can include a computer-readable storage medium having stored thereon program code that, when executed, configures a processor to perform operations including, during the electronically hosted conference, by the processor, monitoring participant activity, for each of a plurality of participants participating in the electronically hosted conference, related to the electronically hosted conference. Based on the participant activity, by the processor, a sentiment of each of the plurality of participants with regard to a subject of the electronically hosted conference can be determined. A list of the participants can be presented to a user by the processor. The list of the participants can indicate an order in which to poll the participants to achieve the desired outcome for a decision requested of the participants in the electronically hosted conference.

BRIEF DESCRIPTION OF THE SEVERAL VIEWS OF THE DRAWINGS

FIG. 2 is a flow chart illustrating a method of guiding a desired outcome for an electronically hosted conference in accordance with another embodiment disclosed within this specification.

DETAILED DESCRIPTION

Figure 1:
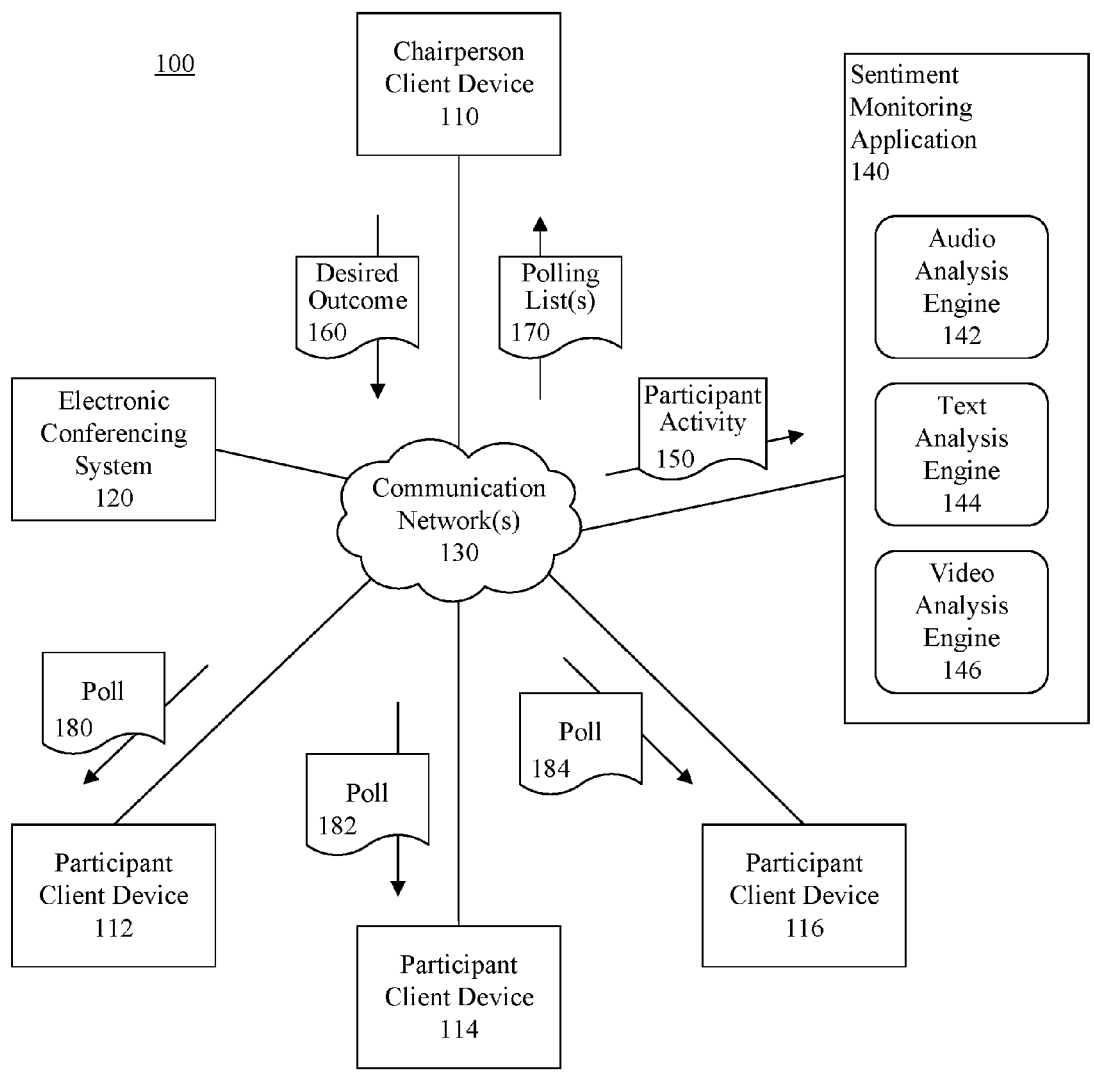
FIG. 1 is a block diagram illustrating a system for guiding a desired outcome for an electronically hosted conference in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to guiding a desired outcome for an electronically hosted conference (hereinafter "conference"). During the conference, activity of participants who are participating in the conference, such as spoken utterances, generated sounds, facial expressions, etc., can be monitored. Based on the participant activity, a sentiment of each participant with regard to a subject of the electronically hosted conference can be determined. At some point during the conference, a determination can be made to poll the participants to provide individual responses, to a decision requested of the plurality of participants. A list can be provided to a user, such as a chairperson, moderator or administrator (hereinafter referred to as "chairperson"), indicating a sequential order in which to poll the respective participants to achieve a desired outcome for responses provided by the participants to a decision requested of the participants.

For example, the participants can be asked to vote on a particular matter. If the chairperson of the conference desires a positive vote, the chairperson can begin polling the participant expressing the most positive sentiment toward the matter, then poll the participant with the next highest positive sentiment, and so on. The participant with the most negative sentiment can be polled last. If the chairperson of the conference desires a negative vote, the polling can begin with the participant expressing the least positive sentiment (or negative sentiment) toward the matter, then the participant with the next lowest positive sentiment can be polled, and so on. The participant with the most positive sentiment can be polled last. If the chairperson of the conference desires a neutral vote, the polling can alternate between those participants having positive sentiment and those participants having negative sentiment. As used herein, the term "poll" means to request an answer to a question or decision that is posed.

Because people oftentimes are influenced by others, polling the participants in a particular order can influence the outcome of the vote. In illustration, if the fifth person being polled is undecided, but the first four people who are polled all vote a particular way, the undecided person may end up voting that same way. Accordingly, polling the participants in a particular order based on participant sentiments can actually influence the votes to achieve the desired outcome.

FIG. 1 is a block diagram illustrating a system 100 for guiding a desired outcome for an electronically hosted conference in accordance with one embodiment disclosed within this specification. The system can include a plurality of client devices, for example a chairperson client device 110 and a plurality of participant client devices 112, 114, 116. The chairperson also can be a participant in the conference, but this need not be the case. Examples of the client devices 110-116 include, but are not limited to, telephones, smartphones, personal digital assistants, computers (e.g., workstations, desktop computers, laptop computers, tablet computers, or the like), and any other devices via which a participant may participate in a conference. In this regard, the conference may be a Web conference, a teleconference, a chat room session, or the like.

The client devices 110-116 can be communicatively linked to an electronic conferencing system 120 via one or more communication networks 130. The communication network(s) 130 can be implemented as, or include, any of a variety of different networks such as a WAN, a LAN, a wireless network, a mobile network, a cellular communication network, a Virtual Private Network (VPN), the Internet, the Public Switched Telephone Network (PSTN), or the like. In this regard, the communication network(s) 130 can include any of a variety of public and/or private networks, and the present arrangements are not limited to any specific type of network. Moreover, any suitable communication protocols may be used, for example TCP/IP, Voice over IP, PSTN protocol, etc.

The electronic conferencing system 120 can be a teleconferencing system, a Web conferencing system, a video conferencing system, a system that hosts a chat room (e.g., via a website) and/or any other type of conferencing system via which a plurality of participants may participate in a conference. For example, the electronic conferencing system 120 can be configured to multicast audio information, audio/video information and/or text. The electronic conferencing system 120 can be hosted on a suitable processing system, such as a server or a client device (e.g., on the chairperson's client device).

The system 100 also can include a sentiment monitoring application 140. The sentiment monitoring application 140 can be executed on the same processing system as the electronic conferencing system 120, or on another processing system communicatively linked to the processing system hosting the electronic conferencing system 120. In one arrangement, the sentiment monitoring application 140 can be included in the electronic conferencing system 120, for example as a plugin or in any other suitable manner. The sentiment monitoring application 140 can include an audio analysis engine 142, a text analysis engine 144 and a video analysis engine 146.

In operation, the electronic conferencing system 120 and, optionally, one or more other systems (not shown) can communicate to the sentiment monitoring application 140 participant activity information 150, for example in suitable messages. The participant activity information 150 can include audio, video, audio/video and/or text information generated by participants of the conference during the conference. Optionally, the participant activity information 150 further can include past audio, video, audio/video and/or text information generated by participants of the conference prior to the conference. The sentiment monitoring application 140 can, based on the participant activity information 150, determine respective sentiments of each of the participants with regard to the subject of the electronically hosted conference.

In illustration, the audio analysis engine 142 can be configured to identify participants as they speak. The audio analysis engine 142 can distinguish between different participants by processing audio signals (e.g., voice signals) generated by the participants and matching the audio signals to known audio signal (e.g., voice) profiles. Further, the audio analysis engine 142 can compare participant names, if spoken, to invitee list(s) of a conference being monitored. If unable to identify a participant, the audio analysis engine 142 can assign a temporary identifier, such as User1, to the participant. If the participant with a temporary designated identifier later speaks a name, the system can replace the temporary identifier with the participant name.

During a conference, the audio analysis engine 142 can monitor audio information, such as spoken utterances, provided by each identified participant. Optionally, the audio analysis engine 142 also can monitor other audio information provided by each participant, such as tapping sounds, etc. The audio analysis engine 142 can process the audio information to identify participant inflections and emotional states of the participants (e.g., whether participants are nervous, angry, excited, confident, opinionated, undecided, unsure etc.). Based on the participant inflections and emotional states, the audio analysis engine 142 can determine the sentiments of the respective participants with regard to the subject of the conference using a suitable algorithm. For example, for a particular participant, the audio analysis engine 142 can determine whether the participant is in agreement or disagreement with the other participants or the chairperson.

The algorithm that processes the audio information can identify participant inflections and emotional states based on vocal patterns, sighs, grunts, clapping, cheering, screaming, and the like, and process such audio information in context with other audio information generated in the conference pertaining to the subject being discussed. In illustration, if a participant sighs while the chairperson is speaking, or interrupts the chair person with a loud voice while the chair person is speaking, such audio information can indicate that the user's sentiment with regard to the subject being discussed by the chairperson is negative. If a participant responds to the chairperson with voice inflections that show agreement, such audio information can indicate that the user's sentiment with regard to the subject being discussed by the chairperson is positive. If certain participants do not speak, sigh, grunt, clap, cheer, scream or the like, their sentiments with regard to the subject of the conference can be considered neutral or undetermined.

In one arrangement, spoken utterances generated during the conference can be converted to a text stream using speech to text analysis (often times referred to as "voice recognition"), and the text analysis engine 144 can analyze the text, for example based on keywords or phrases contained in the text, to determine the sentiments of participants. For example, if the text stream for a particular participant indicates "this is a great idea," the participant's sentiment can be considered positive. If the text stream for a particular participant indicates "this really is a bad idea," the participant's sentiment can be considered negative.

Optionally, for identified participants, the audio analysis engine 142 can process past audio communications related to the subject of the conference, or on topics in general, to identify participant inflections and emotional states of the participants and determine participant sentiments. Past communications could be, for example, phone calls, previous conferences, etc.

In addition to, or in lieu of, processing a text stream provided by the audio analysis engine 142 to determine the sentiments of the participants, the text analysis engine 144 can be configured to monitor text generated in or during the conference to identify participant inflections and emotional states of the participants and determine participant sentiments. For example, the text analysis engine 144 can monitor text based communications generated by the participants during the conference, such as emails, instant messages, chat room communications, blog entries, tweets, etc. The text analysis engine 144 also can monitor text entered in a chat room associated with the conference, contained in messages associated with the conference, text contained in slides and/or presentations presented in the conference, or the like.

Optionally, for identified participants, text analysis engine 144 can process past text based communications related to the subject of the conference, or on topics in general, to identify participant inflections and emotional states of the participants and determine participant sentiments. Past text based communications could be, for example, past emails, instant messages, chat room communications, blog entries, papers, tweets, etc.

The video analysis engine 146 can be configured to monitor video images of participants participating in the conference, if available. Based on the video images the video analysis engine 146 can to identify emotional states of the participants and determine participant sentiments. For example, the video analysis engine 146 can identify facial expressions of the participants, gestures of the participants (e.g., hand/arm movements, fidgeting, and the like), and analyze such facial expressions and gestures to identify emotional states of the participants and determine participant sentiments. The video analysis engine 146 also can determine whether certain participants are sleeping or not paying attention during the conference. Participants found to be sleeping, not be paying attention, or show little facial expression (e.g., indicating they are bored) etc. can be considered either neutral or undetermined with regard to the subject of the conference.

Optionally, for identified participants, video analysis engine 146 can process past video images related to the subject of the conference, or on topics in general, to identify participant inflections and emotional states of the participants and determine participant sentiments. Such past video images can be, for example, video images captured during a previous conference. Participants can be matched to video images, for example, by matching audio signals (e.g., spoken utterances) to facial movements identified in the video images, the direction from which audio signals propagate (e.g., if multiple participants are participating in the conference using the same client device), or the like.

Although each of the audio analysis engine 142, the text analysis engine 144 and the video analysis engine 146 can be configured to identify participant sentiments, when more than one of such engines 142-146 is used during a conference, the sentiment monitoring application 140 can receive sentiment data from each of the engines 142-146, and determine an overall sentiment of each participant based on the sentiment data received from two or more of the engines 142-146. In this regard, the audio analysis engine 142, the text analysis engine 144 and/or the video analysis engine 146 can, when determining sentiments, apply a rating for the sentiment of each participant. The rating can be a score or a single indicator.

The rating can indicate whether a sentiment is positive, negative or neutral (or undermined), and the strength of such sentiment. For example, if the audio, text and/or video information for a particular participant indicates that the participant's sentiment is strongly positive with respect to the subject of the conference, the rating can indicate such. Similarly, if the audio, text and/or video information for a particular participant indicates that the participant's sentiment is strongly negative with respect to the subject of the conference, the rating can indicate such. The ratings also can indicate participants who have a moderately positive sentiment, a moderately negative sentiment, and the like. The sentiment monitoring application 140 can arrive at a total rating by processing the ratings provided by the audio analysis engine 142, the text analysis engine 144 and/or the video analysis engine 146. For example, the sentiment monitoring application 140 can sum such ratings, average such ratings, weight the ratings and average or sum the weighted ratings, or perform any other suitable processing of the ratings to arrive at the total rating.

In illustration, a data table (e.g., in a database) for storing participant sentiment data can be accessed by, or created by, the sentiment monitoring application for the conference. For each participant, the sentiment monitoring application 140 can store in the data table the respective ratings provided by the audio analysis engine 142, the text analysis engine 144 and/or the video analysis engine 146. In this regard, each participant can have a rating for audio information, video information and/or text generated during the conference. Optionally, each participant also can have a rating for past audio information, video information and/or text generated before the conference. The sentiment monitoring application 140 can delete the participant sentiment data, or the entire data table, at the conclusion of the conference, though this need not be the case. For example, the chair person can be prompted to choose whether to retain the data/data table and or to delete the data/data table.

At some point in time, either before the conference begins or during the conference, the chairperson can, via the chairperson client device 110, indicate a desired outcome 160 for the conference. The desired outcome can be, for example, a desired result correlating to a request for a decision or question posed to the participants. For instance, the chairperson, or another participant in the conference, may ask the participants to vote on a certain matter. The desired outcome 160 can indicate the chairperson's desired outcome of such vote. For example, the chairperson can indicate that the desired outcome is "yes." The desired outcome can be communicated to the sentiment monitoring application 140 in a suitable message.

When, or prior to, a decision is made to poll the participants for their responses to the requested decision or question, the sentiment monitoring application 140 can communicate one or more polling lists 170, for example in one or more suitable messages, to the chairperson (e.g., to the client device 110). The polling list 170 can indicate an order in which to poll the participants to achieve the desired outcome for a decision requested of the participants in the electronically hosted conference. If, for example, the desired outcome is "yes," the participants can be presented to the chairperson in the polling list 170 in a particular order indicating the likelihood of each participant to answer "yes." For example, the participant most likely to answer "yes," based on the sentiment indicators, can be presented at the top of the polling list 170. The participant least likely to answer "yes," based on the sentiment indicators, can be presented at the bottom of the polling list 170. Other participants presented in the polling list 170 can be sequentially listed based on the likelihood of them answering "yes." If the desired outcome 160 is "no," the order in which the participants are presented in the polling list 170 can be presented reversely from that described for a "yes" desired outcome. Optionally, the polling list 170 further can include, for each participant, an indicator that indicates the respective sentiment of the participant.

If the desired outcome 160 is "neutral," or the chairperson has not entered a desired outcome 160, the polling list 170 can sequentially alternate between participants likely to answer "yes" and participants likely to answer "no." In another arrangement, if the chairperson has not entered a desired outcome 160, a plurality of polling lists 170 can be presented to the chair person. For example, participants presented in one polling list 170 can be sequentially listed based on the likelihood of them answering "yes." In another polling list 170, participants can be sequentially listed based on the likelihood of them answering "no." In another polling list 170, the participants can be presented with sequential alternation between participants likely to answer "yes" and participants likely to answer "no." Again, the polling lists 170 further can include, for each participant, an indicator that indicates the respective sentiment of the participant.

When the chairperson requests a vote on the requested decision or question, the chair person can poll the participants in the order provided in the polling list 170. For example, the chairperson can first poll 180 a participant using the participant client device 112 for the conference, then poll 182 a participant using the client device 114 for the conference, then poll 184 a participant using the client device 116 for the conference, and so on. Such polling 180-184 can be implanted via suitable messages communicated from the client device 110 to the client devices 112-116. Responsive to the polling 180-184, the participants can sequentially provide their respective votes, via the respective client devices 112-116, in the conference. The polling 180-184 can be implemented via audio, video, audio/video and/or text. Similarly, the answers can be provided via audio, video, audio/video and/or text.

FIG. 2 is a flow chart illustrating a method 200 of guiding a desired outcome for an electronically hosted conference in accordance with another embodiment disclosed within this specification. At step 202, during an electronically hosted conference, participant activity related to the electronically hosted conference can be monitored for each of a plurality of participants participating in the electronically hosted conference. At step 204, based on the participant activity, via a processor, a sentiment of each of the plurality of participants with regard to a subject of the electronically hosted conference can be determined. At step 206, a list of the participants can be presented to the user. The list of participants can be sequentially ordered, based on the sentiment of each of the plurality of participants, indicating an order in which to poll the participants to achieve the desired outcome for a decision requested of the participants in the electronically hosted conference.

Figure 3:
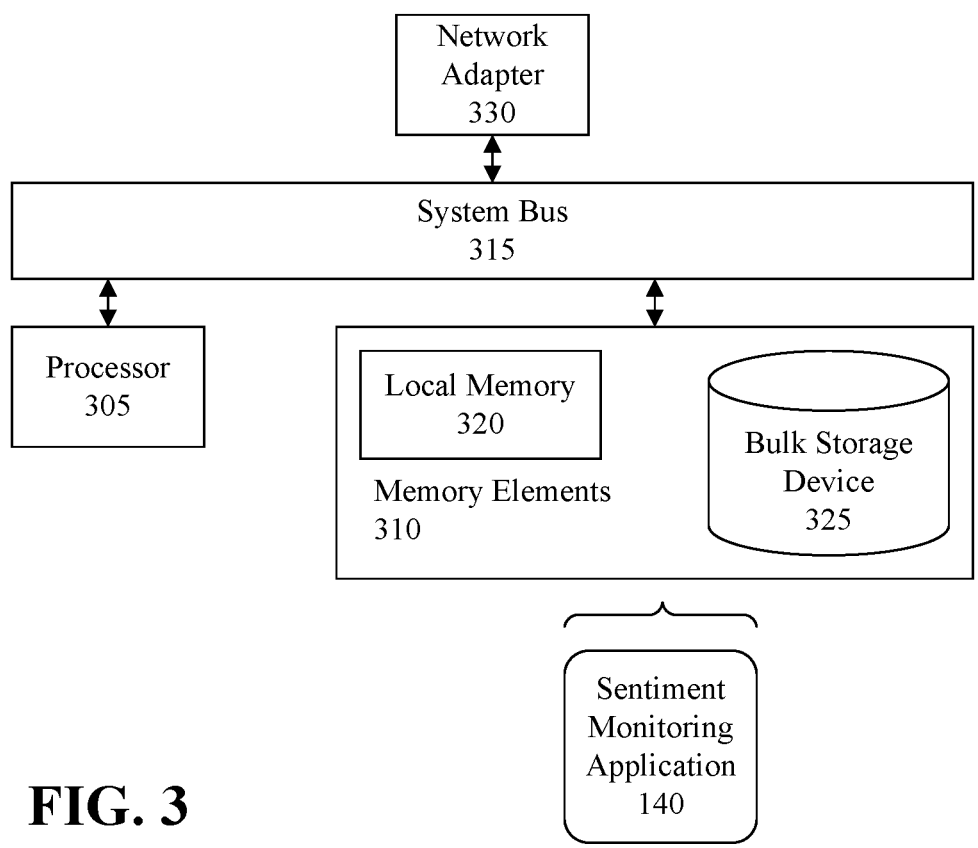
FIG. 3 is a block diagram illustrating a processing system for guiding a desired outcome for an electronically hosted conference in accordance with one embodiment disclosed within this specification.

FIG. 3 is a block diagram illustrating a processing system 300 for guiding a desired outcome for an electronically hosted conference in accordance with one embodiment disclosed within this specification.

The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices, such as network adapter 330, can be coupled to the processing system 300. The I/O devices can be coupled to the processing system 300 either directly or through intervening I/O controllers. The network adapter 330 can enable processing system 300 to become coupled to other systems, computer systems, remote printers, and/or remote storage devices through intervening private or public networks. Modems, cable modems, transceivers, and Ethernet cards are examples of different types of network adapters 330 that can be used with processing system 300.

As pictured in FIG. 3, the memory elements 310 can store the sentiment monitoring application 140 of FIG. 1. In an arrangement in which the electronic conferencing system 120 of FIG. 1 and the sentiment monitoring application 140 are executed by the same processing system 300, the memory elements 310 also can store the electronic conferencing system 120. Being implemented in the form of executable program code, sentiment monitoring application 140 can be executed by the processing system 300 and, as such, can be considered part of the processing system 300. Moreover, the sentiment monitoring application 140 is a functional data structure that imparts functionality when employed as part of the processing system 300 of FIG. 3. Further, the messages in which the participant activity information 150 and desired outcome 160 are communicated also are functional data structures that impart functionality when processed by the processing system 300 of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of guiding a desired outcome for an electronically hosted conference comprising:
   during the electronically hosted conference, monitoring participant activity, for each of a plurality of participants participating in the electronically hosted conference, related to the electronically hosted conference;
   based on the participant activity, determining, via a processor, a sentiment of each of the plurality of participants with regard to a subject of the electronically hosted conference; and
   presenting to a user a list of the participants indicating an order in which to poll the participants to achieve the desired outcome for a decision requested of the participants in the electronically hosted conference.

2. The method of claim 1, further comprising:
   receiving from the user an indication of the desired outcome.

3. The method of claim 1, wherein presenting to the user the list of the participants comprises:
   indicating the respective sentiment for each of the plurality of participants.

4. The method of claim 1, wherein monitoring participant activity related to the electronically hosted conference comprises:
   monitoring audio information provided by participants during the electronically hosted conference.

5. The method of claim 1, wherein monitoring participant activity related to the electronically hosted conference comprises:
   monitoring text generated or presented by participants during the electronically hosted conference.

6. The method of claim 1, wherein monitoring participant activity related to the electronically hosted conference comprises:
   monitoring video images of the participants during the electronically hosted conference.

7. The method of claim 1, wherein determining the sentiment of each of the plurality of participants with regard to the subject of the electronically hosted conference further is based on participant activity prior to the electronically hosted conference, the participant activity prior the electronically hosted conference selected from a group consisting at least one past audio communication related to the subject of the conference, at least one past text based communication related to the subject of the conference, and at least one past video image related to the subject of the conference.

8. A system comprising:
   a processor programmed to initiate executable operations comprising:
   during an electronically hosted conference, monitoring participant activity, for each of a plurality of participants participating in the electronically hosted conference, related to the electronically hosted conference;
   based on the participant activity, determining a sentiment of each of the plurality of participants with regard to a subject of the electronically hosted conference; and
   presenting to a user a list of the participants indicating an order in which to poll the participants to achieve the desired outcome for a decision requested of the participants in the electronically hosted conference.

9. The system of claim 8, the executable operations further comprising:
   receiving from the user an indication of the desired outcome.

10. The system of claim 8, wherein presenting to the user the list of the participants comprises:
    indicating the respective sentiment for each of the plurality of participants.

11. The system of claim 8, wherein monitoring participant activity related to the electronically hosted conference comprises:
    monitoring audio information provided by participants during the electronically hosted conference.

12. The system of claim 8, wherein monitoring participant activity related to the electronically hosted conference comprises:

monitoring text generated or presented by participants during the electronically hosted conference.

13. The system of claim 8, wherein monitoring participant activity related to the electronically hosted conference comprises:
monitoring video images of the participants during the electronically hosted conference.

14. The system of claim 8, wherein determining the sentiment of each of the plurality of participants with regard to the subject of the electronically hosted conference further is based on participant activity prior to the electronically hosted conference, the participant activity prior the electronically hosted conference selected from a group consisting at least one past audio communication related to the subject of the conference, at least one past text based communication related to the subject of the conference.

15. A computer program product for guiding a desired outcome for an electronically hosted conference, the computer program product comprising a computer-readable storage device having program code stored thereon, the program code executable by a processor to perform a method comprising:
during the electronically hosted conference, by the processor, monitoring participant activity, for each of a plurality of participants participating in the electronically hosted conference, related to the electronically hosted conference;
based on the participant activity, determining, by the processor, a sentiment of each of the plurality of participants with regard to a subject of the electronically hosted conference; and
presenting, by the processor, to a user a list of the participants indicating an order in which to poll the participants to achieve the desired outcome for a decision requested of the participants in the electronically hosted conference.

16. The computer program product of claim 15, the method further comprising:
receiving, by the processor, from the user an indication of the desired outcome.

17. The computer program product of claim 15, wherein presenting to the user the list of the participants comprises:
indicating the respective sentiment for each of the plurality of participants.

18. The computer program product of claim 15, wherein monitoring participant activity related to the electronically hosted conference comprises:
monitoring audio information provided by participants during the electronically hosted conference.

19. The computer program product of claim 15, wherein monitoring participant activity related to the electronically hosted conference comprises:
monitoring text generated or presented by participants during the electronically hosted conference.

20. The computer program product of claim 15, wherein monitoring participant activity related to the electronically hosted conference comprises:
monitoring video images of the participants during the electronically hosted conference.

\* \* \* \* \*